US009764489B2

(12) United States Patent
Arnetoli (10) Patent No.: US 9,764,489 B2
(45) Date of Patent: Sep. 19, 2017

(54) GRASS-CUTTING HEAD (71) Applicant: ARNETOLI MOTOR S.R.L., Reggello (IT)

(72) Inventor: Fabrizio Arnetoli, Reggello (IT)

(73) Assignee: ARNETOLI MOTOR S.R.L., Reggello (FI) (IT)

(*) Notice: Subject to any disclaimer, the term of this patent is extended or adjusted under 35 U.S.C. 154(b) by 260 days.

(21) Appl. No.: 14/057,312

(22) Filed: Oct. 18, 2013

(65) Prior Publication Data
US 2014/0109411 A1 Apr. 24, 2014

(30) Foreign Application Priority Data

Oct. 19, 2012 (IT) ................ FI2012A0219

(51) Int. Cl.
*B26D 7/00* (2006.01)
*A01D 34/416* (2006.01)
*A01D 34/73* (2006.01)

(52) U.S. Cl.
CPC ........... *B26D 7/00* (2013.01); *A01D 34/4166* (2013.01); *A01D 34/733* (2013.01)

(58) Field of Classification Search
CPC .............. A01D 34/412; A01D 34/416; A01D 34/4161; A01D 34/4162; A01D 34/4163; A01D 34/4165; A01D 34/4166; A01D 34/4167; A01D 34/4168; A01D 34/42; Y10T 403/7039
USPC .... 30/276; 403/354, 360, 364, 359.1, 539.3, 403/359.4, 81, 84, 104
See application file for complete search history.

(56) References Cited

U.S. PATENT DOCUMENTS

| | | | | |
|---|---|---|---|---|
| 4,258,536 A * | 3/1981 | Kidd | ...................... | A01D 34/73 56/17.5 |
| 4,823,542 A * | 4/1989 | Klever | ................ | A01D 34/001 56/12.7 |
| 5,463,815 A * | 11/1995 | Fogle | ................ | A01D 34/4168 30/276 |
| 5,657,542 A * | 8/1997 | White, III | .......... | A01D 34/4163 30/276 |
| 5,765,958 A * | 6/1998 | Lan | .......................... | B62B 7/06 403/84 |
| 5,873,701 A * | 2/1999 | Shiu | ........................ | F04D 29/34 416/205 |
| 6,112,416 A * | 9/2000 | Bridges | ................ | A01D 34/733 30/276 |
| 6,401,344 B1 * | 6/2002 | Moore | ............... | A01D 34/4166 30/276 |
| 6,519,857 B1 * | 2/2003 | Proulx | ................. | A01D 34/416 30/276 |

(Continued)

*Primary Examiner* — Jason Daniel Prone
*Assistant Examiner* — Richard Crosby, Jr.
(74) *Attorney, Agent, or Firm* — McGlew and Tuttle, P.C.

(57) ABSTRACT

A multi-function grass-cutting head (100), of the type intended to be associated with a motor to rotate around an axis of rotation (X) thereof, including a peripheral area (103) which extends around the axis of rotation (X) and at least one supporting portion (104) for at least one cutting element (105) provided on the peripheral area (103). The head also includes structure (106) for adjusting the angular position of the supporting portion (104) of the at least one cutting element (105), around an axis of adjustment (Y), transverse to the axis of rotation (X) of the head.

20 Claims, 9 Drawing Sheets

(56) References Cited

U.S. PATENT DOCUMENTS

| | | | | |
|---|---|---|---|---|
| 6,666,009 B1* | 12/2003 | Brandon | ............ | A01D 34/4166 30/276 |
| 6,817,102 B2* | 11/2004 | Harris | .................. | A01D 34/736 30/276 |
| 7,111,403 B2* | 9/2006 | Moore | ................ | A01D 34/4166 30/276 |
| 7,257,898 B2* | 8/2007 | Iacona | ................. | A01D 34/416 30/276 |
| 7,536,792 B2* | 5/2009 | Moore | ............... | A01D 34/4166 30/276 |
| 7,603,782 B2* | 10/2009 | Jerez | .................... | A01D 34/416 30/276 |
| 7,703,268 B2* | 4/2010 | Yanke | ................. | A01D 34/733 56/255 |
| 7,878,097 B2* | 2/2011 | Strader | ................ | A01D 34/733 30/276 |
| 8,069,758 B2* | 12/2011 | Zhang | ................ | A01D 34/733 30/276 |
| 8,973,274 B2* | 3/2015 | Proulx | ............... | A01D 34/4166 30/122 |

* cited by examiner

GRASS-CUTTING HEAD

TECHNICAL FIELD

The present invention relates in general to the field of brushcutters, and more particularly relates to an axial rotation grass-cutting head, for brushcutters, capable of having several functions, besides that of normal cutting.

STATE OF THE ART

As it is known, grass-cutting heads for brushcutters generally comprise a disk-shaped casing which has a connection to the rotating shaft of the brushcutter. From the periphery of the casing one or more cutting elements extend outward, which can be constituted by cutting lines—or lengths of cutting line—or by a blade, according to the type of head.

Lines and blades are mainly of the type that can be replaced once damaged or worn.

Replacement of the cutting elements is generally the only "adjustment" that can be performed on the head, and its operating mode is substantially constant over time.

There are also multi-function brushcutters able to perform different types of work, generally all "cutting" operations, which require replacement of the head with other devices suitable for the particular operation/cut to be performed (hedge-cutter, power saw, etc.). Therefore, the user must purchase and carry all the accessories required for the different types of work.

OBJECT AND SUMMARY OF THE INVENTION

The main object of the present invention is that of producing a grass-cutting head that is "multi-function", i.e. that can perform different functions or cutting effects without necessarily having to replace the whole head.

A further important object of the present invention is that of producing a grass-cutting head that can perform different functions simultaneously.

Another important object of the present invention is that of producing a grass-cutting head that is versatile in operation and structurally simple.

These and other objects, which will be more apparent hereunder, are achieved with a multi-function grass-cutting head, of the type intended to be associated with a motor to rotate around its own axis of rotation, which comprises a peripheral area that extends around the axis of rotation and at least one supporting portion for at least one cutting element provided on said peripheral area; this head also comprises means for adjusting the angular position of the supporting portion of said at least one cutting element between at least two stable working positions, around an axis of adjustment, transverse to the axis of rotation of the head, i.e. lying on plane on which the axis of rotation of the head is incident. Preferably, the axis of adjustment lies on a plane orthogonal to the axis of rotation of the head.

As will be more apparent from the description below, this axis of adjustment can be fixed with respect to the axis of rotation, or can oscillate on a plane incident on, preferably orthogonal to, the axis of rotation.

According to some preferred embodiments, the means for adjusting the angular position of the supporting portion comprise a constraint of relative rotation around the axis of adjustment for a first part associated with the peripheral area of the head, and for a second part adapted to support said at least one cutting element; there are present engagement/disengagement means provided mutually on said first and second part, which define, when in engaged attitude, at least two stable positions for the second part (the one carrying the cutting element) around the axis of adjustment, and adapted to enable relative rotation of said two parts when they are in disengaged attitude. Naturally, the stable positions are the positions of adjustment and can also be more than two in number.

In this latter configuration, preferably, between said first part and said second part there is present both a rotational constraint around the axis of adjustment and an axial sliding constraint adapted to engage/disengage the first and the second part preventing/enabling relative rotation of the two parts to perform adjustment of the angular position. In practice, to adjust the axial position of the cutting element it is necessary to make the second part slide axially on the first part, releasing the two parts with respect to the constraint that prevents rotation thereof around the axis of adjustment, and rotate the second part on the first by an angle equal to the desired angular adjustment.

Preferably, between the first and the second part there are present elastic means, for example a helical spring, adapted to oppose the relative axial sliding of the second part on the first part from the engagement attitude to the disengagement attitude.

According to some preferred embodiments, the engagement/disengagement means comprise at least one engagement tooth associated with the first or with the second part, and a plurality of engagement seats distributed along a circumference coaxial with the axis of adjustment, definite on the second or on the first part. Therefore, in this case, adjustment of the angular position around the axis of adjustment takes place discretely.

According to some preferred embodiments, the aforesaid first part is produced in, or defines, a housing defined in the casing of the head, while the second part is housed in this housing.

In this latter configuration, preferably, the housing has walls at least partly cylindrical in shape and the second part comprises a cylindrical portion adapted to couple rotationally with this cylindrical shape; advantageously, on the cylindrical portion of the second part there are produced a plurality of engagement seats, while on the walls of the housing there is provided one or more engagement teeth for the seats.

According to some preferred embodiments, the head comprises hinging means of the at least one supporting portion in the peripheral area of the head in such a manner as to oscillate freely around an axis which extends from the bottom upward when the axis of rotation of the head is oriented vertically; therefore, the axis of adjustment is not fixed with respect to the axis of rotation of the head, but can oscillate around an axis of oscillation; preferably this axis of oscillation is substantially parallel to the axis of rotation of the head.

According to some preferred embodiments, the aforesaid first part is hinged to the casing of the head, in such a manner that the assembly formed by the first part and second part is adapted to oscillate freely around an axis which extends from the bottom upward when the axis of rotation of the head is oriented vertically; preferably said axis of oscillation being substantially parallel to the axis of rotation of the head.

Due to this hinging, the cutting element is oscillating with respect to the head, so that in the case of violent impacts it can oscillate in such a manner as to reduce the opposing effect that could damage the same cutting element.

According to some embodiments concerning this type with the axis of adjustment oscillating, the elastic means that oppose the relative axial movement between first and second part, comprise at least one elastic element a first end of which abuts against a first resting surface defined on said first part and a second end abuts against a second surface of said second part; the second part comprises a third surface adapted to abut against a corresponding fourth surface of the first part, with said fourth surface that is opposite the cutting element with respect to said first surface.

Advantageously, according to some embodiments, the first part comprises a cylindrical through hole coaxial with the axis of adjustment, and the second part comprises, in series, a head, a cylindrical stem inserted in the cylindrical hole and an enlarged base arranged at the end of the stem and arranged opposite said head with respect to said first part; preferably the at least one cutting element is supported through, and/or on, said head.

According to one or more preferred embodiments, the head comprises a block on which there is at least partly produced, and/or blocked, at least one cutting element; this block is blocked or coupled with a cavity defined in the aforesaid second part.

According to preferred embodiments, the aforesaid at least one engagement tooth and the corresponding plurality of engagement seats distributed along a circumference coaxial with the axis of adjustment, defined on the second or on the first part, are provided respectively on an outer face of the first part and on said enlarged base, or vice versa.

According to some preferred embodiments, the supporting part of said at least one cutting element is external to the casing of the head.

Advantageously, according to preferred examples of embodiment, the head comprises reversible fixing means of said at least one cutting element to said at least one supporting portion.

According to other embodiments, the cutting element is associated irreversibly with the related supporting portion.

Advantageously, according to other embodiments, the cutting edge part of the cutting element is spaced from the axis of adjustment. In this way, by varying the angular position of the cutting element, the cutting edge changes position with respect to a direction parallel to the axis of rotation of the head.

According to preferred embodiments, the at least one cutting element is hinged to the second supporting part according to an axis of oscillation transverse to the axis of adjustment. In this way the cutting element is oscillating with respect to the head so that in the case of violent impacts, it can oscillate in such a manner as to reduce the opposing effect that could damage the same cutting element.

According to embodiments, the at least one cutting element comprises at least one cutting line. For example, in the case of several cutting lines lying on a common plane, in the case of angular adjustment of their support, the lines can be located on a plane, for example perpendicular to the axis of rotation of the head and therefore act on a common cutting plane, in a conventional manner. Otherwise, by adjusting the angular position thereof, the lines can be located on a common plane, for example parallel to the axis of rotation and therefore the lines act on three distinct cutting planes, producing a chopping effect of the grass.

According to preferred embodiments, the cutting element comprises a blade. By adjusting the angular position of the blade around the axis of adjustment, it is possible to position the blade in such a manner that its flat extension is substantially parallel to the axis of rotation of the head (in practice the cutting edge is orthogonal to the direction of rotation and does not produce a cutting action), thereby transforming the blade into a "fan" useful for clearing the ground. The flat extension of the blade can also be inclined with respect to the axis, producing both a cutting action and a "fan" effect.

According to preferred embodiments, the at least one cutting element comprises a blade and one or more lines which project from the body of said blade from an opposite position with respect to the cutting edge of the blade, so that by rotating the blade from a cutting attitude to an attitude, for example, substantially orthogonal thereto, the lines are arranged from the top downward, and enable sweeping of the ground.

According to preferred embodiments, the at least one cutting element comprises a plurality of elements in a comb- or brush-shaped arrangement.

According to preferred embodiments, the cutting element is, or comprises, a brush.

According to preferred embodiments, the axis for adjusting the angular position of said supporting portion passes through the same supporting portion.

According to preferred embodiments, the head comprises a plurality of said supporting portions arranged along the periphery of the casing of the head, and each supporting portion supports one or more cutting elements.

According to this latter case, preferably, at least two supporting portions have respective different cutting elements and preferably a first supporting portion supports at least one blade and a second supporting portion supports at least one cutting line.

BRIEF DESCRIPTION OF THE DRAWINGS

Further characteristics and advantages of the invention will become more apparent from the description of several preferred but non-exclusive embodiments thereof, illustrated by way of non-limiting example in the accompanying drawings, wherein.

DETAILED DESCRIPTION OF AN EMBODIMENT OF THE INVENTION

With reference to FIGS. 1, 2, 3 and 7 to 22 previously mentioned, a first type of multi-function grass-cutting head according to the invention is indicated as a whole with 100. This head has a casing formed by a disk-shaped body 101 which comprises, for example, two disk-shaped covers, lower 101A and upper 101B, mutually coupled according to the axis of rotation X of the head. The disk-shaped body 101 comprises a central fixing area 102 of the power shaft 92 of the motor of the grass-cutting device to which it must be associated.

Figure 1:
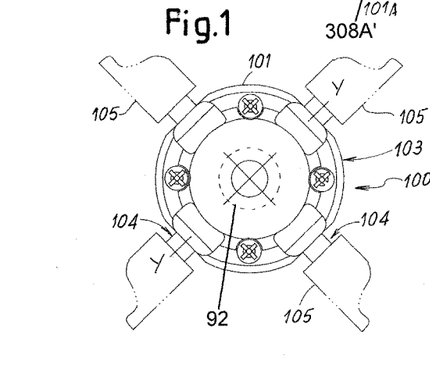
FIG. 1 represents a plan view of a first type of head according to the invention, wherein the cutting elements are indicated generically and schematically.

The disk-shaped body 101 has a peripheral area 103, in practice an annular area that extends around the axis of rotation X and, on this peripheral area, one or more supporting portions 104 for one or more cutting elements, which can be of different types, as better described below; in FIGS. 1, 2 and 3 the cutting elements are shown schematically and are indicated with the number 105. The figures show examples of heads with four supporting portions 104, but in other embodiments supporting portions can be in a different number to four (from one to several portions).

The head also comprises means 106 for adjusting the angular position of the supporting portion 104 of one or more cutting elements 105 around an axis of adjustment Y, transverse to the axis of rotation of the head, i.e. lying on a plane on which the axis of rotation of the head is incident. More in particular, in these examples the axis of adjustment Y lies on a plane orthogonal to the axis of rotation X of the head, intersecting this latter. Even more in particular, the axis Y lies on an interface plane between the two disk-shaped covers 101A and 101B.

In these examples, the axis of adjustment Y is fixed with respect to the axis of rotation X of the head, i.e. rotates around X integral with the body 101.

The means 106 for adjusting the angular position of the supporting portion 104 comprise a constraint of relative rotation around the axis of adjustment Y for a first part 107, associated with the peripheral area of the head, and for a second part 108 adapted to support one or more cutting elements 105.

There are also present engagement/disengagement means, described below, provided mutually on the first and on the second part, which define, when in engaged attitude, a plurality of stable positions for the second part 108 (the part carrying the cutting element or elements) around the axis of adjustment Y, and adapted to enable relative rotation of the two parts 107 and 108 when they are in disengaged attitude.

In these examples, the first part 107 is a housing 207A with walls extending cylindrically, defined in the casing of the head, while the second part 108 is housed in in an interior space 90 of the housing 207A and comprises a cylindrical portion 208A' adapted to couple rotationally with the cylindrical shape of the housing 207A.

On the cylindrical portion 208A' there is produced the plurality of engagement seats 109 for a tooth 110 (several teeth can be present) provided in the housing 207A. Coupling of the tooth 110 with a respective seat 109 defines a stable position for the second part 108 with respect to the first part 107, around the axis of adjustment Y.

Besides the rotational constraint produced by the coupling of cylindrical shape, the first and the second part also have an axial sliding constraint along Y, adapted to engage/disengage the first and the second part 107, 108 preventing/enabling relative rotation of the two parts to perform adjustment of the angular position. In practice, to adjust the angular position of the sec and part 108 around Y, i.e. of the cutting element 105 around Y, it is necessary to make the second part 108 slide axially along Y on the first part 107, releasing the two parts with respect to the constraint that prevents rotation thereof around the axis of adjustment Y, i.e. to extract the tooth 110 from the seat 109 currently occupied, and rotate the second part on the first by an angle equal to the desired angular adjustment. The second part is then made to slide once again along Y to return the tooth 110 to the seat 109 relating to that angular position.

The housing 207A has a bottom 207A' and a top 207A", against which the cylindrical portion 208A' is adapted to abut when the second part 108 is in stable position. This top has a hole 207A'" through which there is arranged slidingly a stem 208A" for connection to the supporting part 208' of the cutting element 105. The tooth 110 is arranged on the top 207A" in the interior space 90 of the housing 207A.

Advantageously, between the first and the second part there are present elastic means 111, for example a helical spring adapted to oppose the relative axial sliding of the second cylindrical part 208A' in the cylindrical housing 207A of the first part, from the engagement attitude to the disengagement attitude of the tooth 110 with the respective seat 109. For example, the spring 111 is arranged between the bottom 207A' of the housing 207A and a portion of the second part 108. The spring 111 thrusts the cylindrical portion 208A' onto the top 207A" so that tooth 110 and respective seat 109 engage. In practice, tooth 110, seats 109 and spring 111 form the aforesaid engagement/disengagement means of the first and of the second part 107, 108.

Figure 2:
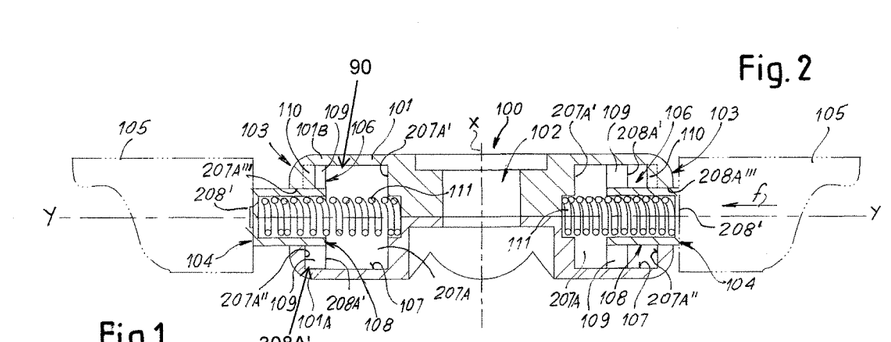
FIG. 2 represents a front view in diametric section of the head of FIG. 1.
Figure 3:
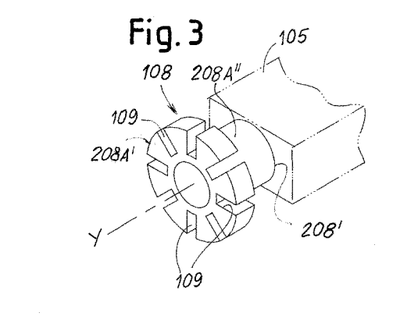
FIG. 3 represents a detail of a part of the head that supports a cutting element, indicated generically and schematically.

It must be noted that in FIG. 2 the second left part 108 (the left of the person observing the figure), is engaged with the tooth 110 in the seat 109, while the second right part 108 is in translating phase (compression of the spring 111) according to the arrow f, i.e. in seat/tooth disengagement phase.

Figure 4:
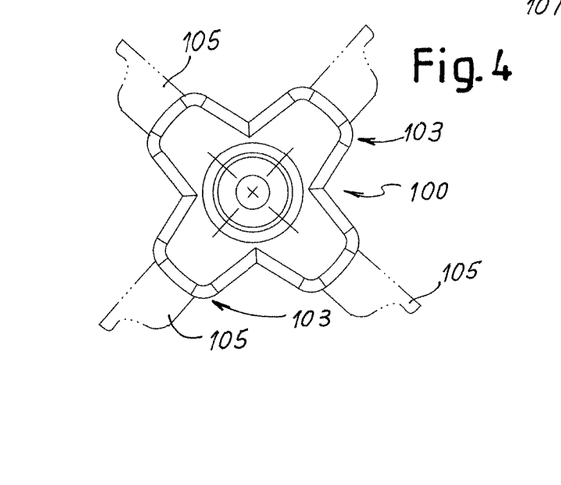
FIG. 4 represents a plan view of a second type of head according to the invention, wherein the cutting elements are indicated generically and schematically.
Figure 5:
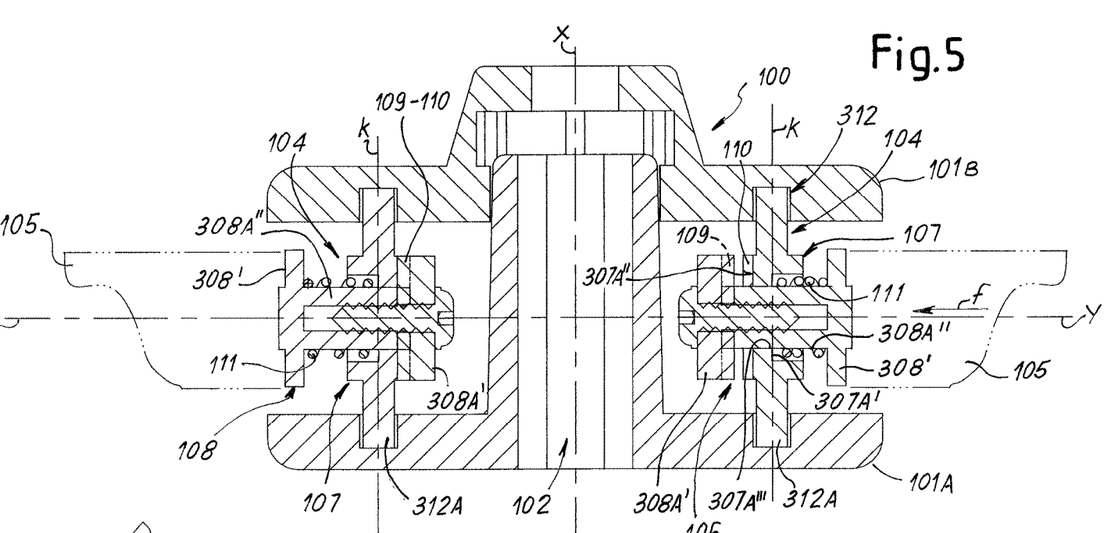
FIG. 5 represents a front view in diametric section of the head of FIG. 4
Figure 6:
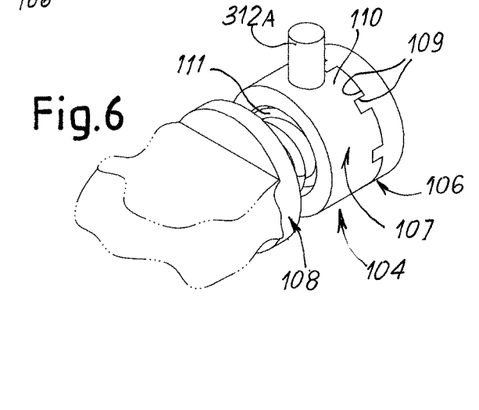
FIG. 6 represents a detail of a part of the head that supports a cutting element, indicated generically and schematically.

FIGS. 4, 5 and 6 show a second type of head according to the invention, varying with respect to the one describe above. For the parts corresponding to the case described, the same reference numerals will be used.

In this type, the head 100, in the peripheral area 103, comprises hinging means 312 for a respective supporting portion 104 for one (or more) cutting elements 105 (also in this case shown schematically), in such a manner that the supporting portion 104 (and therefore the cutting element 105) is capable of oscillating freely around an axis K which extends from the bottom upward, i.e. preferably vertically, when the axis of rotation X of the head is oriented vertically; therefore the axis of adjustment Y is not fixed with respect to the axis of rotation of the head, but can oscillate around the axis of oscillation K, which, in this example, is preferably parallel to the axis of rotation of the head.

With respect to the previous case, in which the first part that forms the supporting portion 104 was produced in the casing of the head and defined a housing 207A for the second part 108 directly supporting the cutting element, the assembly now formed by the first part 107 and the second part 108 (the same numbering as the previous case has been maintained for similar parts) is adapted to oscillate freely around the axis K. Advantageously, it is the first part 107 that is hinged to the ca sing of the head, for example by two opposite pins 312A, inserted, for example, in respective holes produced on the two covers 101A and 101B.

Due to this hinging, the cutting element is oscillating with respect to the head so that in the case of violent impacts it can oscillate in such a manner as to reduce the opposing effect that could damage the same cutting element.

In this example, the first part 107 comprises a cylindrical through hole 307A'", coaxial with the axis of adjustment Y, and the second part 108 comprises, in series, a head 308', a cylindrical stem 308A" inserted in the cylindrical hole 307A'" and an enlarged base 308A' arranged at the end of the stem 308A" (fixed thereto for example by means of a screw) and arranged opposite the head 308' with respect to the first part 107. The cutting element is supported through and/or on said head 308A", as better described below.

Also in this example, there are present elastic means 111 which oppose the relative axial movement between first and second part 107, 108. These elastic means comprise at least one elastic element, for example a helical spring, a first end of which abuts against a first surface 307A' defined on the first part 107 and a second end of which abuts against a second surface defined on the head 308' of the second part 108; the second part 108 comprises a third surface, provided with a circumferential plurality of seats 109, coaxial with the axis Y, adapted to abut against a corresponding fourth surface 307A" of the first part 107 on which there is defined a plurality of engagement teeth 109 for the seats 109, with said fourth surface 307A" which is opposite the cutting element with respect to said first surface 307A'.

Seats 109, teeth 110 and spring 111 form the engagement/disengagement means as in the previous case.

It is understood that the concept tooth/seat can be considered relatively, i.e. the space between two teeth can be viewed as a seat and the space between two seats can be viewed as a tooth. Moreover, there can be present, as in the previous case, a single tooth.

Operation is substantially analogous to the previous case. In practice, to adjust the angular position of the second part 108 around Y, i.e. of the cutting element 105 around Y, it is necessary to make the second part 108 slide axially along Y, overcoming the force of the spring 111 and releasing the two parts with respect to the constraint that prevents rotation thereof around the axis of adjustment Y, i.e. extract the teeth 110 from the seats 109 currently occupied, and rotate the second part on the first by an angle equal to the desired angular adjustment. The spring then makes the second part slide once again along Y to return the teeth 110 into the seats 109 with the desired angular position.

It must be noted that in FIG. 5 the second left part 108 (the left of the person observing the figure), is engaged with the tooth 110 in the seat 109, while the second right part 108 is in translating phase (compression of the spring 111) according to the arrow f, i.e. in seat/tooth disengagement phase.

FIGS. 7 to 22 show heads like the type of the first case described (i.e. the head of FIGS. 1 to 3), which carry different types of cutting elements. In these figures the head will be indicated as a whole with the number 100'.

Figure 7:
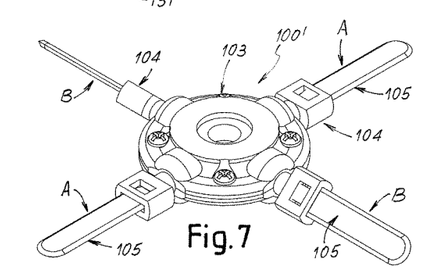
FIG. 7 represents an axonometric view of a first embodiment of head according to the type of FIG. 1.
Figures 8, 9:
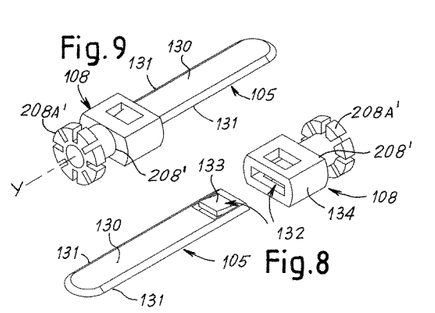
FIG. 8 represents an exploded view of the part that carries a cutting blade and of the cutting blade, referred to FIG. 8.
FIG. 9 represents the assembly of FIG. 8.

FIGS. 7, 8 and 9 show a head 100', which shows a plurality of supporting portions 104 for cutting elements 105 formed by a blade, and the parts relating to the cutting element. In particular, the blade has a body 130 with flat extension on at least one longitudinal edge of which a cutting edge is defined 131.

In this example, there are present means 132 for reversibly fixing the blade 105 to the supporting portion 104, which are formed, for example, by a snap coupling (for example using an elastically deformable tab 133) of one end of the body 130 of the blade in an appropriately shaped corresponding housing defined in a block 134 integral with the second part 108 (with reference to FIGS. 1, 2 and 3, to the area indicated with 208') of the supporting portion 104.

According to the angular position around Y, the blade can take different orientations. With the flat extension of the blade substantially orthogonal to the axis of rotation X of the head, the blade merely has a cutting function. Adjusting the angular position of the blade around the axis of adjustment, it is also possible to position the blade in such a manner that its flat extension is substantially parallel to the axis of rotation X of the head (in practice the plane of the cutting edge 131 is orthogonal to the direction of rotation, and does not produce a cutting action), thus transforming the blade into a "fan" useful for clearing the ground. The flat extension of the blade can also be inclined with respect to the axis X, producing both a cutting action and a "fan" effect. In FIG.

7 the head has two opposite blades oriented to enable only cutting (situation A) and two opposite blades oriented inclined to perform both a cutting action and a fan action (situation B).

Figure 10:
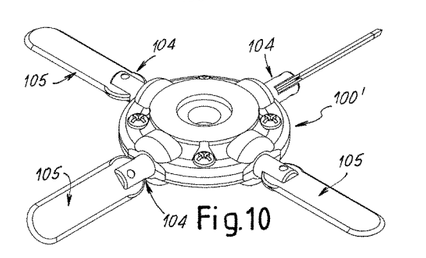
FIG. 10 represents an axonometric view of a second embodiment of head according to the type of FIG. 1.
Figures 11, 12:
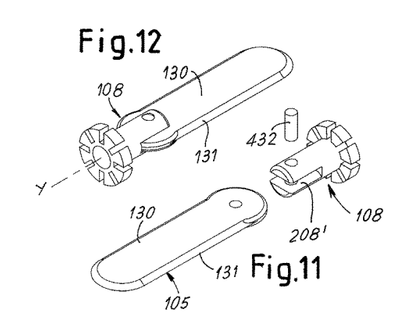
FIG. 11 represents an exploded view of the part that carries a cutting blade and of the cutting blade, referred to FIG. 10.
FIG. 12 represents the assembly of FIG. 11.

FIGS. 10, 11 and 12 show a head 100', which shows a plurality of supporting portions 104 for cutting elements 105 formed by a blade, and the parts relating to the cutting element.

Also in this case, the blade has a body 130 with flat extension on at least one longitudinal edge of which a cutting edge 131 is defined.

In this example, the body 130 of the blade is hinged, for example by means of a pin 432, to the second part 108 (with reference to FIGS. 1, 2 and 3, to the area indicated with 208') of the supporting portion 104. The hinge axis is preferably orthogonal to the axis of adjustment Y. In this way the blade is oscillating with respect to the head so that in the case of violent impacts it can oscillate in such a manner as to reduce the opposing effect that could damage the same blade.

Figure 13:
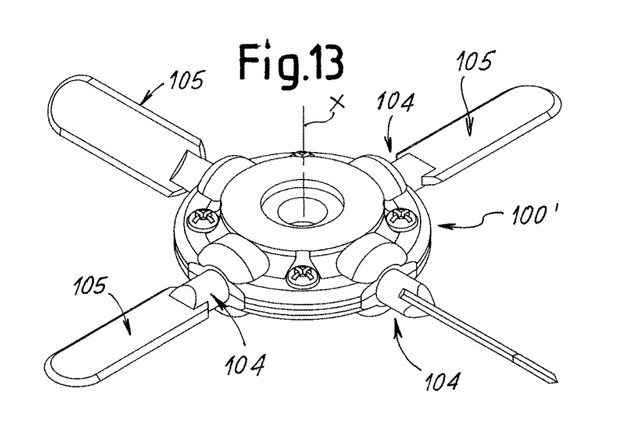
FIG. 13 represents an axonometric view of a third embodiment of head according to the type of FIG. 1.
Figure 14:
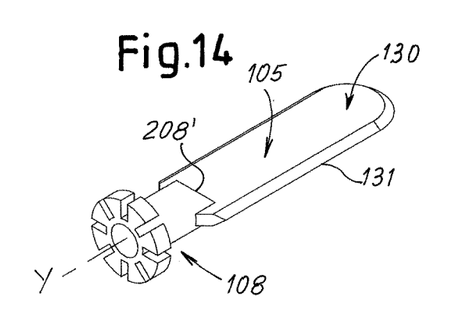
FIG. 14 represents the arrangement only of the part that carries a cutting blade and of the cutting blade, referred to FIG. 13.

FIGS. 13 and 14 show a head 100', which shows a plurality of supporting portions 104 for cutting elements 105 formed by a blade, and the parts relating to the cutting element.

This example is similar to that of FIGS. 7-9, with the difference that the body 130 of the blade is irreversibly integral with the second part 108 (with reference to FIGS. 1, 2 and 3, to the area indicated with 208') of the supporting portion 104.

Figures 15, 16, 17:
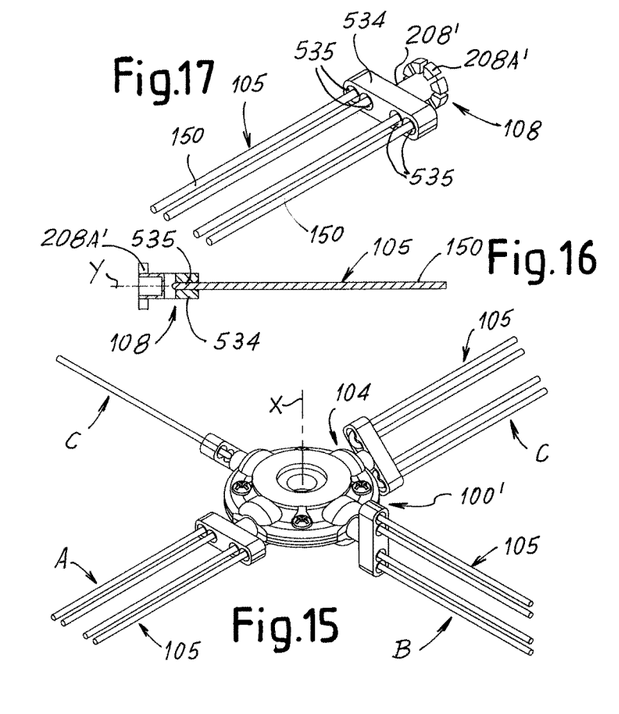
FIG. 15 represents an axonometric view of a third embodiment of head according to the type of FIG. 1.
FIG. 16 represents a section of the part of head that carries the cutting line, referred to FIG. 15.
FIG. 17 represents an axonometric view of the part of FIG. 16.

FIGS. 15, 16 and 17 show a head 100', which shows a plurality of supporting portions 104 for cutting elements 105 formed by cutting lines 150, and the parts relating to the cutting elements.

In this example, a block 534 is present, integral with the second part 108 (with reference to FIGS. 1, 2 and 3, to the area indicated with 208') of the supporting portion 104, which has four through holes 535 extending preferably parallel to the axis of adjustment Y, arranged in pairs. Each pair of through holes 535 is adapted to receive a cutting line 150 bent in a U-shape to partly surround the space of the block comprised between the two holes of the pair, opposite with respect to the face from which the end of the line exits from the block. The inlets and outlets of the holes are on substantially opposite (preferably parallel) faces of the block 534.

According to the angular position around Y, the lines can take different orientations. For example, in the case of several cutting lines or portions of a same line lying on a common plane, in the case of angular adjustment of their support, the lines can be located on a plane, for example perpendicular to the axis of rotation X of the head and therefore act on a common cutting plane (situation indicated with A in FIG. 15), in a conventional manner. Otherwise, by adjusting the angular position thereof, the lines or the portions of line can be located on a common plane for example parallel to the axis of rotation X (situation indicated with B in FIG. 15) and therefore the lines (or portions of line) act on distinct cutting planes, producing a chopping effect of the grass. Naturally, by adjusting the angular position thereof, the lines or the portions of line can be located on a common plane that is inclined with respect to the axis of rotation X (situations indicated with C in FIG. 15), producing a different chopping effect with respect to the situation B.

Figures 18, 19, 20:
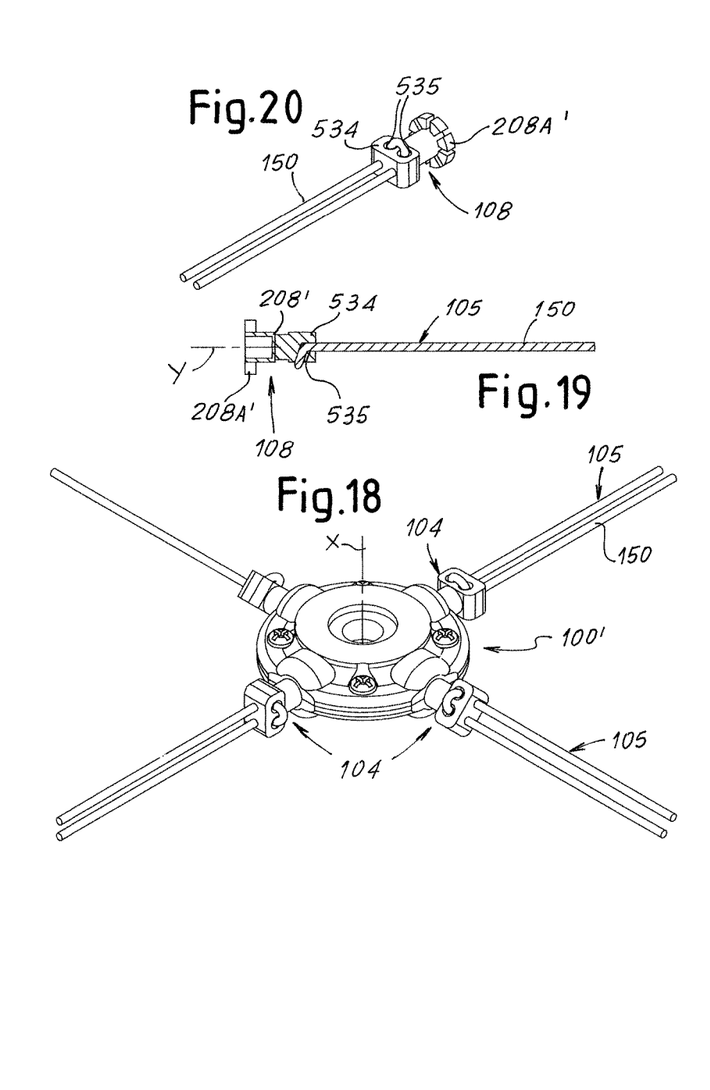
FIG. 18 represents an axonometric view of a fourth embodiment of head according to the type of FIG. 1.
FIG. 19 represents a section of the part of head that carries the cutting lines, referred to FIG. 18.
FIG. 20 represents an axonometric view of the part of FIG. 19.

FIGS. 18, 19 and 20 show a head 100', which shows a plurality of supporting portions 104 for cutting elements 105 formed by a single cutting line 150, and the parts relating to the cutting element.

With respect to the previous example, there is a variation in the number of lines (from two to one) and consequently in the number of through holes 535 (from four to two) on the block 534 (with reference to FIGS. 1, 2 and 3, the block corresponds to the area indicated with 208') of the supporting portion 104. Moreover, in this example, the inlets of the holes 535 are preferably on a face of the block incident on (preferably orthogonal to) the face on which the outlets for the portions of the lines are produced. The orientation situations are analogous to those of the previous example.

Figure 21:
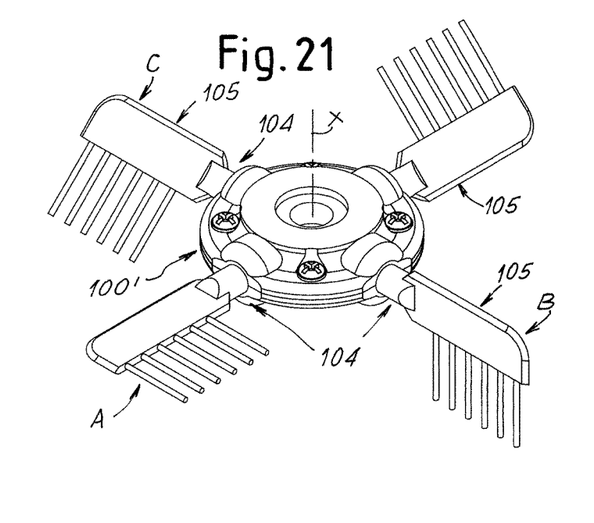
FIG. 21 represents an axonometric view of a fifth embodiment of head according to the type of FIG. 1.
Figure 22:
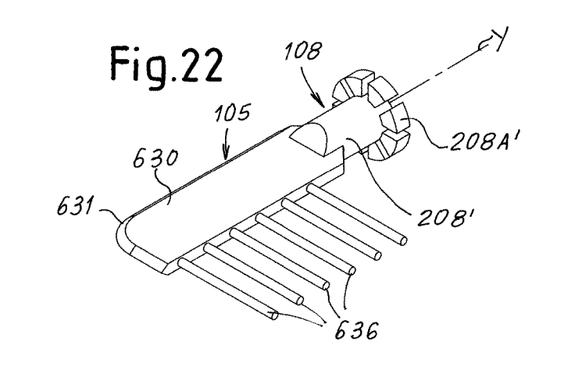
FIG. 22 represents an axonometric view of the part carrying a cutting blade/brush, relating to FIG. 21.

FIGS. 21 and 22 show a head 100', which shows a plurality of supporting portions 104 for cutting elements 105. In this example, each cutting element comprises a blade with flat body 630 (which extends, with reference to FIGS. 1, 2 and 3, from the area indicated with 208') and longitudinal edge on which a cutting edge 631 is produced. From the opposite edge there extend, preferably parallel to the flat extension of the blade, a plurality of lines (or teeth) 636, with orientation preferably orthogonal to the longitudinal extension of the cutting edge. When the cutting elements are arranged with the flat extension of the blade body 630 orthogonal to the axis of rotation X of the head, these have a cutting function (the head rotates with a direction such that the cutting edges 631 lead the rotation), see the situation A in FIG. 21. With the cutting elements oriented around the axis of adjustment Y in such a manner that the lines 636 are facing vertically downward from the body 630, the lines perform the function of the teeth of a brush (situation B in FIG. 21). With the body 630 inclined with respect to the axis X and the lines 636 facing downward from the body 630, the cutting element has both cutting function and brushing function (situation C in FIG. 21). In other embodiments, the supporting portion 104 can only support one or more brushes (i.e. without cutting elements).

FIGS. 23 to 44 show heads like the type of the second case described (i.e. the head of FIGS. 4 to 7), which carry different types of cutting elements. In these figures, the head will be indicated as a whole with the number 100".

Figures 23, 24, 25, 26, 27, 28:
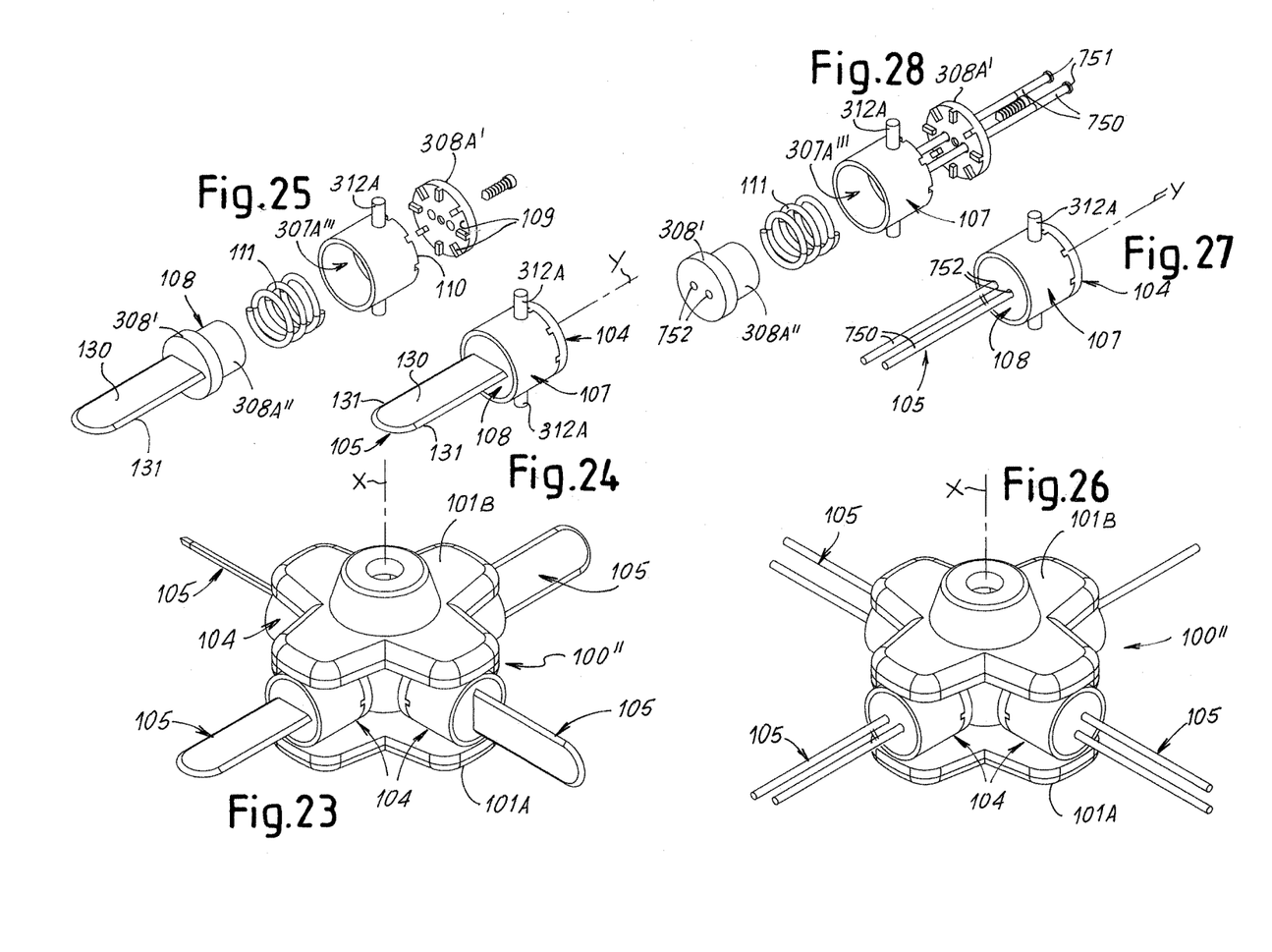
FIG. 23 represents an axonometric view of a sixth embodiment of head according to the type of FIG. 4.
FIG. 24 represents an assembly of the part that carries a cutting blade and of the cutting blade, referred to FIG. 8.
FIG. 25 represents the exploded view of FIG. 23.
FIG. 26 represents an axonometric view of a seventh embodiment of head according to the type of FIG. 4.
FIG. 27 represents an assembly of the part that carries a cutting line, referred to FIG. 26.
FIG. 28 represents the exploded view of FIG. 27.

FIGS. 23, 24 and 25 show a head 100", which shows a plurality of oscillating supporting portions 104 for cutting elements 105 formed by a blade, and the parts relating to the cutting element. In particular, the blade has a body 130 with flat extension, on at least one longitudinal edge of which a cutting edge 131 is defined. In this example, the body 130 is irreversibly integral with the second part 108, and can change orientation around the axis of adjustment Y. Analogously to the case of FIGS. 5, 6 and 7, the supporting portion 104 comprises a first part 107 which comprises opposite pins 312A for hinging to the casing of the head, a second part 108 which comprises a head 308' (from which the blade extends), a cylindrical stem 308A" inserted in the cylindrical hole 307A''' and an enlarged base 308A' arranged at the end of the stem 308A". Analogous engagement/disengagement means 109, 110 and 111 are present.

FIGS. 26, 27 and 28 show a head 100", which shows a plurality of oscillating supporting portions 104 for cutting elements 105 formed by cutting lines 750, and the parts relating to the cutting element. This head differs from that of the previous example substantially due to the fact that it does not have a blade but through holes 752 produced on the head 308', with extension preferably parallel to the ax is of adjustment Y, for arrangement of the lines 750, which have respective enlarged ends 751 to abut against the respective inlets of the holes 752.

Figure 29:
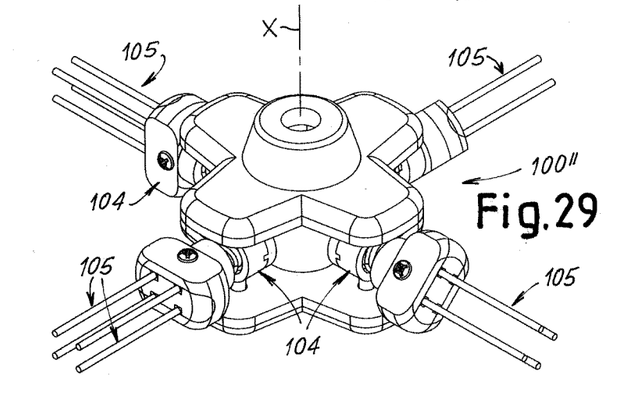
FIG. 29 represents an axonometric view of an eighth embodiment of head according to the type of FIG. 4.
Figures 30, 31:
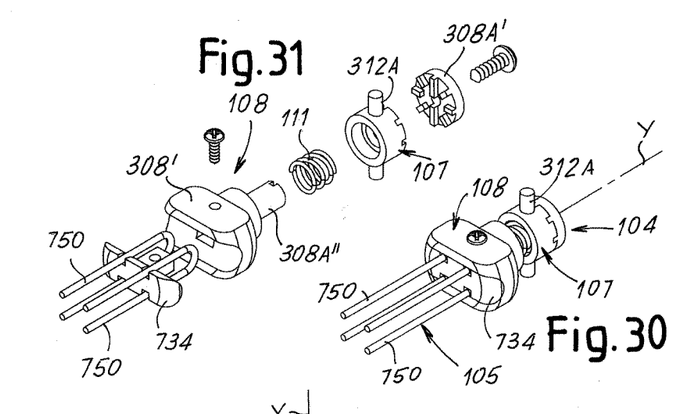
FIG. 30 represents an assembly of the part that carries a cutting line, referred to FIG. 29.
FIG. 31 represents the exploded view of FIG. 30.

FIGS. 29, 30 and 31 show a head 100", which shows a plurality of oscillating supporting portions 104 for cutting elements 105 formed by cutting lines 750, and the parts relating to the cutting element. This head differs from that of the previous example substantially due to the fact that it has two cutting lines 750, which surround in a U-shape a fixing block 734, reversibly fixed to the head 308', thus defining four portions of cutting lines that lie on two planes parallel to each other and parallel to the axis of adjustment Y.

Figure 32:
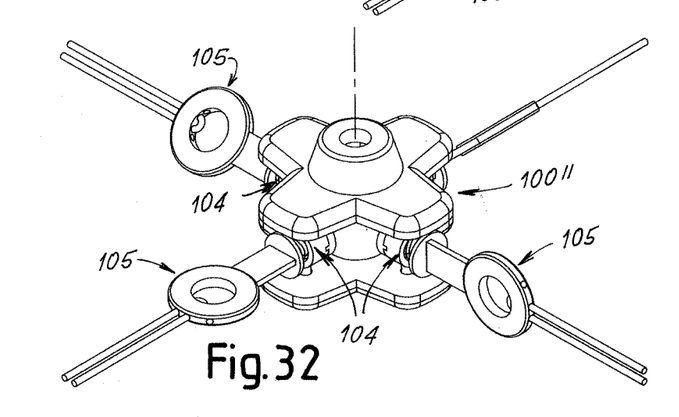
FIG. 32 represents an axonometric view of a ninth embodiment of head according to the type of FIG. 4.
Figures 33, 34:
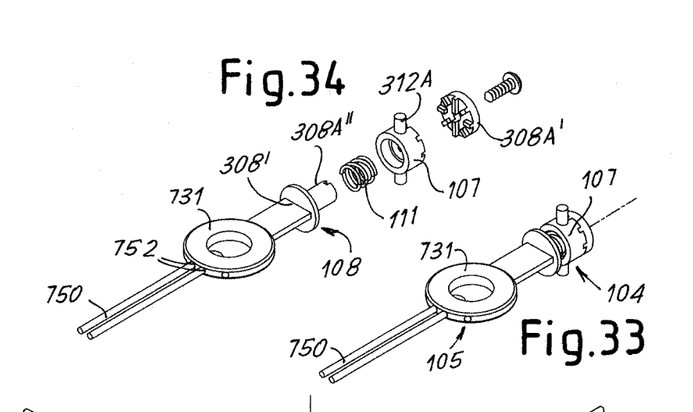
FIG. 33 represents an assembly of the part that carries a cutting line, referred to FIG. 32.
FIG. 34 represents the exploded view of FIG. 33.

FIGS. 32, 33 and 34 show a head 100", which shows a plurality of oscillating supporting portions 104 for cutting elements 105 formed by a cutting line 750, and the parts relating to the cutting element. This head differs from that of the previous example substantially due to the fact that is has a head 308' in the form of flat body with ring-shaped end portion, in the thickness of which there are produced at least two through holes 752 for insertion of the ends of the line 750 in such a manner that the line surrounds in a U-shape part of this ring-shaped portion. If necessary, the flat edge of the head 308' can form a cutting edge 731, so that the cutting effect is present both along the portions of line 750, and along the second part 108.

Figure 35:
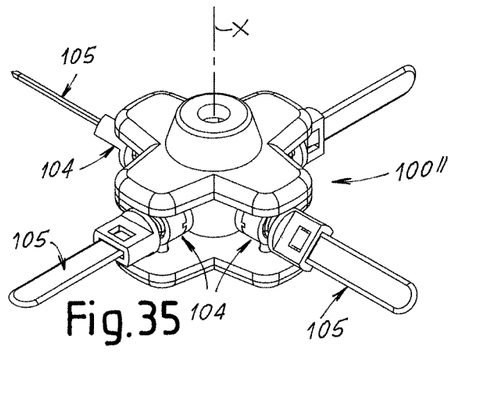
FIG. 35 represents an axonometric view of a tenth embodiment of head according to the type of FIG. 4.
Figures 36, 37:
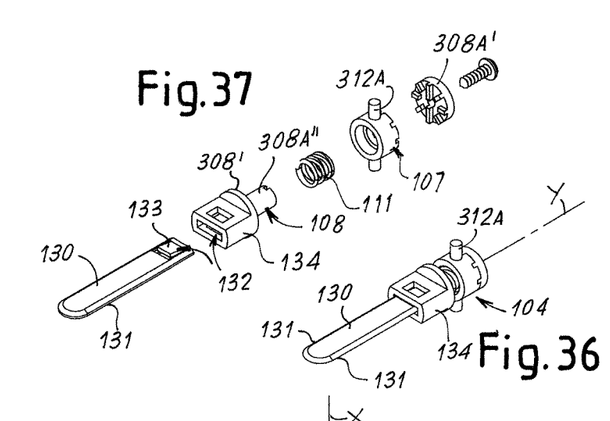
FIG. 36 represents an assembly of the part that carries a cutting blade and of the cutting blade, referred to FIG. 35.
FIG. 37 represents the exploded view of FIG. 36.

FIGS. 35, 36 and 37 show a head 100", which shows a plurality of oscillating supporting portions 104 for cutting elements 105 constituted by blades, each formed by a body 130 with flat extension, on at least one longitudinal edge of which a cutting edge 131 is defined.

In this example, there are present means 132 for reversibly fixing the blade 105 to the supporting portion 104, which are formed, for example, by a snap coupling (for example using an elastically deformable tab 133) of one end of the body 130 of the blade in a corresponding appropriately shaped housing defined in a block 134 integral with the second part 108 (with reference to FIGS. 4, 5 and 6, to the area indicated with 308') of the supporting portion 104. This example is substantially analogous to the case of FIGS. 7, 8 and 9.

Figure 38:
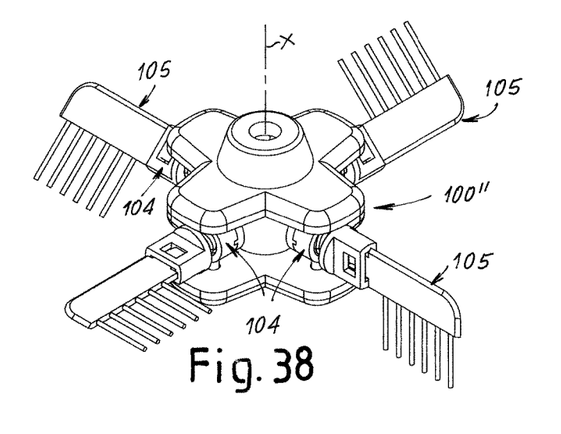
FIG. 38 represents an axonometric view of an eleventh embodiment of head according to the type of FIG. 4.
Figures 39, 40:
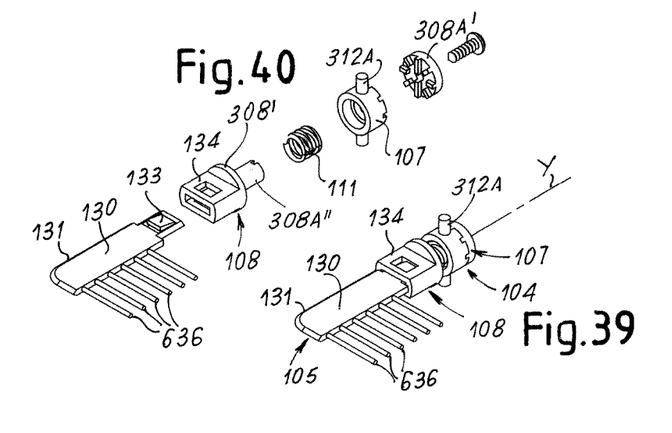
FIG. 39 represents an assembly of the part that carries a cutting blade/brush, referred to FIG. 38.
FIG. 40 represents the exploded view of FIG. 39.

FIGS. 38, 39 and 40 show a head 100", which shows a plurality of oscillating supporting portions 104 for cutting elements 105 like those of FIG. 21, i.e. blades from which teeth or brushing lines extend. In practice, the body 130 of the blade at one end has a snap coupling with a block 134 as in the previous example of FIG. 35 (in practice, it is a combination of the examples of FIG. 21 and of FIG. 35).

FIGS. 41, 42, 43 and 44 show a head 100", which shows a plurality of oscillating supporting portions 104 for cutting elements 105, and the parts relating to the cutting element. As in the other examples of oscillating supporting portions, this example comprises a first part 107 which comprises opposite pins 312A for hinging to the casing of the head, a second part 108 which comprises a head 308', a cylindrical stem 308A" inserted into the cylindrical hole 307A''', an enlarged base 308A' arranged at the end of the stem 308A" (in the form of a ring fixed by means of a pin to the stem) and engagement/disengagement means 109, 110 and 111 in the form of teeth, seats and spring. More in particular, in this example there is present a block 834' (or 834") reversibly fixable to the head 308', for example by insertion in a related housing cavity 860. This block 834' has a U-shaped channel 861 to receive a cutting line 750 in such a manner that this is arranged with two opposite portions toward the outside of the block and therefore of the head, preferably with orientation parallel to the axis of adjustment Y. Alternatively, a block 834" with which a blade with body 130 and cutting edge 131 is integral can be used.

Figure 41:
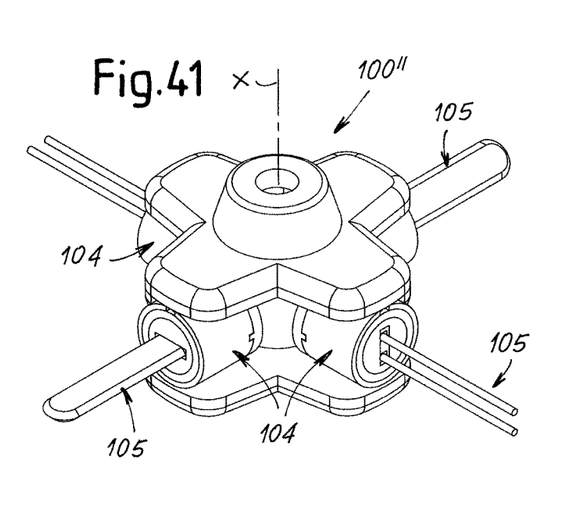
FIG. 41 represents an axonometric view of a twelfth embodiment of head according to the type of FIG. 4.
Figures 42, 43, 44:
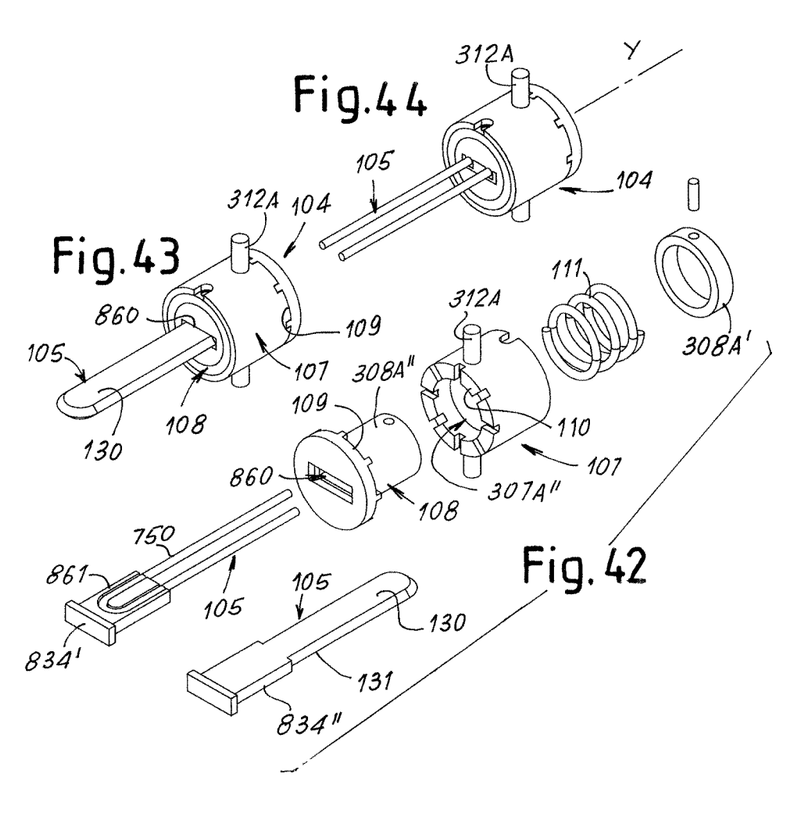
FIG. 42 represents an exploded view of the part that carries a cutting blade or a cutting line, referred to FIG. 41.
FIGS. 43 and 44 represent the assembly of the part of FIG. 42, respectively relating to a blade and to a cutting line.

It must be noted that FIG. 41 shows the case of a head carrying both blades and cutting lines. More in general, different types of cutting elements (or other accessories for example for brushing), adjustable around the axis of adjustment Y, oscillating or not, can be associated simultaneously with the head. It is understood that the various examples described can be combined with one another, both with regard to the cutting elements described for the first type of head 100' to be used in the second type of head 100", and vice versa. Moreover, it is also possible to use heads formed partly by supporting portions fixed to the head as in the case of the heads 100' and partly by oscillating supporting portions as in the case of the heads 100".

Preferably, as shown in many of the examples described above, the supporting part of one or more cutting elements is external to the plan projection of the casing of the head.

It must be noted that, advantageously, the cutting part of each cutting element is spaced from the axis of adjustment Y. In this way, by varying the angular position of the cutting element, the cutting edge changes position with respect to a direction parallel to the axis of rotation of the head, enabling a plurality of functions, such as chopping of the grass in the case of several cutting lines, a combined fan and cutting effect, in the case of blades and, more in general, a variation of the distance in height of the cutting area, which in practice enables a further adjustment of the cut.

Finally, it must be noted that the means 106 for adjusting the angular position of the supporting portion 104 described enable a "discrete" adjustment, i.e. in steps, due to the presence of teeth and complementary seats (and therefore the supporting portion 104 cannot take any position around Y, but only that enabled by "discretization"). In other embodiments, this adjustment can also take place "continuously", i.e. the supporting portion 104 can take any angular stable working position around Y, and stable coupling of first part and second part can take place, for example, through means for blocking rotation around Y of first part 107 and second part 108 of friction type.

It is understood that the drawing only shows possible non-limiting embodiments of the invention, which can vary in forms and arrangements without however departing from the scope of the concept on which the invention is based. Any reference numerals in the appended claims are provided purely to facilitate the reading thereof, in the light of the above description and accompanying drawings, and do not in any way limit the scope of protection.

The invention claimed is:

1. A multi-function grass-cutting head, comprising:
   an axis of rotation of said head;
   a cutting element;
   a casing comprising a disk-shaped body, said disk-shaped body comprising a central fixing area for a power shaft of a motor of the grass-cutting head, said disk-shaped body further comprising a peripheral area which extends around said axis of rotation; and
   at least one supporting portion connected to at least said cutting element for supporting said cutting element, said at least one supporting portion being provided in an area of said peripheral area;
   an axis of adjustment of an angular position of said supporting portion, said axis of adjustment being transverse to said axis of rotation of the head;
   a means for adjusting the angular position of said supporting portion and said cutting element relative to said casing, around said axis of adjustment to adjust an inclination of said cutting element.

2. The grass-cutting head according to claim 1, wherein said disk-shaped body comprises a first part associated with said peripheral area, said supporting portion being connected to a second part, said first part being non-rotatably fixed relative to said second part, wherein an engagement/disengagement means is provided mutually on said first part and said second part for fixing said second part in a non-rotatably fixed position when said first part and said second part are an engaged state and for providing relative rotation of said second part, relative to said first part, when said first part and said second part are in a disengaged state.

3. The grass-cutting head according to claim 2, wherein said second part is prevented from moving in an axial direction when said first part and said second part are in said engaged state, said second part being movable in the axial direction when said first part and said second part are in said disengaged state such that said second part is rotatable relative to said first part to adjust the angular position of said cutting element and said supporting portion, wherein at least a portion of said first part and at least a portion of said second part are located in an interior space of said disk-shaped body.

4. The grass-cutting head according to claim 3, wherein an elastic means is in contact with said first part and said second part for opposing axial sliding of said second part on said first part when said first part and said second part are in said engaged state.

5. The grass-cutting head according to claim 2, wherein said engagement/disengagement means comprises at least one engagement tooth associated with one of said first part and said second part, and a plurality of engagement seats distributed around said axis of adjustment, defined on another one of said second part and said first part.

6. The grass-cutting head according to claim 2, wherein said first part is produced in a housing defined in a casing of the head and said second part is housed in said housing.

7. The grass-cutting head according to claim 5, wherein walls of a housing are at least partly cylindrical in shape and said second part comprises a cylindrical portion adapted to couple rotationally with said cylindrical shape of the housing, on said cylindrical portion of said second part there being produced a plurality of said engagement seats, on said walls of said housing there being provided said at least one engagement tooth for said seats.

8. The grass-cutting head according to claim 1, further comprising:
a hinging means of said at least one supporting portion in said peripheral area of the head in such a manner as to oscillate freely around an axis which extends from a bottom upward when the axis of rotation of the head is oriented vertically.

9. The grass-cutting head according to claim 2, wherein said first part is hinged to a casing of the head, in such a manner that an assembly formed by said first part and said second part is adapted to oscillate freely around an axis which extends from a bottom upward when the axis of rotation of the head is oriented vertically; preferably said axis of oscillation being substantially parallel to the axis of rotation of the head.

10. The grass-cutting head according to claim 4, wherein said elastic means comprises at least one elastic element a first end of which abuts against a first surface defined on said first part and a second end abuts against a second surface of said second part, said second part comprising a third surface adapted to abut against a corresponding fourth surface of said first part, said fourth surface being opposite said cutting element with respect to said first surface.

11. The grass-cutting head according to claim 2, wherein said first part comprises a cylindrical through hole coaxial with said axis of adjustment, and said second part comprises, in series, a head, a cylindrical stem inserted in said cylindrical hole and an enlarged base arranged at an end of said stem and arranged opposite said head with respect to said first part; preferably said at least one cutting element being supported through, and/or on, said head.

12. The grass-cutting head according to claim 5, wherein said at least one engagement tooth and said plurality of engagement seats distributed along a circumference coaxial with said axis of adjustment, defined on said second part or said first part, are provided respectively on an outer face of one of said first part and said second part and on an enlarged base of another one of said first part and said second part, at least a portion of said at least one engagement tooth being arranged in one of said engagement seats when said first part and said second part are in said engaged state to prevent said second part from rotating relative to said first part, said at least one engagement tooth being located at a spaced location from said plurality of engagement seats when said first part and said second part are in said disengaged state to allow said second part to rotate relative to said first part.

13. The grass-cutting head according to claim 2, wherein said at least one cutting element is hinged to said second supporting part according to an axis of oscillation transverse to said axis of adjustment.

14. The grass-cutting head according to claim 1, wherein said cutting element comprises at least one cutting line and/or one blade, said disk-shaped body defining at least a portion of an interior space, said disk-shaped body comprising a body portion located in said interior space, at least a portion of said support being located in said interior space, said portion of said support being detachably connected to said body portion, wherein said cutting element remains connected to said disk-shaped body when said portion of said support is connected to said body portion and when said portion of said support is detached from said body portion, said portion of said support being rotatable relative to said body portion when said portion of said support is detached from said body portion.

15. The grass-cutting head according to claim 1, wherein said at least one cutting element comprises a blade and one or more lines or teeth which project from a body of said blade from an opposite position with respect to a cutting edge of the blade and adapted to act as teeth of a rotary brush.

16. The grass-cutting head according to claim 6, wherein walls of said housing are at least partly cylindrical in shape and said second part comprises a cylindrical portion adapted to couple rotationally with said shape of the housing, on said cylindrical portion of said second part there being produced a plurality of engagement seats, on said walls of said housing there being provided at least one engagement tooth for said seats.

17. The grass-cutting head according to claim 8, wherein a first part is hinged to a casing of the head, in such a manner that an assembly formed by said first part and a second part is adapted to oscillate freely around an axis which extends from the bottom upward when the axis of rotation of the head is oriented vertically, said axis of oscillation being substantially parallel to the axis of rotation of the head.

18. The grass-cutting head according to claim 9, wherein an elastic means comprises at least one elastic element a first end of which abuts against a first surface defined on said first part and a second end abuts against a second surface of said second part, said second part comprising a third surface adapted to abut against a corresponding fourth surface of said first part, said fourth surface being opposite said cutting element with respect to said first surface.

19. The grass-cutting head according to claim 11, wherein at least one engagement tooth and a plurality of engagement seats distributed along a circumference coaxial with said axis of adjustment, defined on said second part or said first part, are provided respectively on an outer face of said first part and on said enlarged base or vice versa.

20. A multi-function grass-cutting head, comprising:
   an axis of rotation of said head;
   a cutting element;
   a casing comprising a disk-shaped body, said disk-shaped body comprising a central fixing area for a power shaft said disk-shaped body further comprising a peripheral area which extends around said axis of rotation and at least one supporting portion for at least said cutting element provided on said peripheral area;
   an axis of adjustment of an angular position of said supporting portion, said axis of adjustment being transverse to said axis of rotation of the head;
   a means for adjusting the angular position of said supporting portion, around said axis of adjustment, wherein said means for adjusting the angular position of said supporting portion comprises a first part associated with said peripheral area of the head, and a second part adapted to support said cutting element, each of said first part and said second part comprising engagement/disengagement means for producing, when in an engaged state of said first part and said second part, at least two stable positions for said second part around said axis of adjustment, and for enabling relative rotation of said first part and said second part when the first part and the second part are disengaged, wherein the cutting element is connected to said casing when the first part and the second part are disengaged.

* * * * *